US011677250B2

(12) United States Patent
Stevens

(10) Patent No.: US 11,677,250 B2
(45) Date of Patent: Jun. 13, 2023

(54) STAND MOUNT GRIP SYSTEM

(71) Applicant: Brett R. Stevens, Emmett, ID (US)

(72) Inventor: Brett R. Stevens, Emmett, ID (US)

( * ) Notice: Subject to any disclaimer, the term of this patent is extended or adjusted under 35 U.S.C. 154(b) by 440 days.

(21) Appl. No.: 17/023,686

(22) Filed: Sep. 17, 2020

(65) Prior Publication Data

US 2021/0281090 A1 Sep. 9, 2021

Related U.S. Application Data

(60) Provisional application No. 62/987,315, filed on Mar. 9, 2020.

(51) Int. Cl.
*H02J 7/00* (2006.01)
*F16M 11/04* (2006.01)
(Continued)

(52) U.S. Cl.
CPC ......... *H02J 7/0044* (2013.01); *F16M 11/041* (2013.01); *G03B 17/561* (2013.01); *H04M 1/04* (2013.01); *F16M 2200/08* (2013.01)

(58) Field of Classification Search
USPC .......................................... 320/113, 114, 115
See application file for complete search history.

(56) References Cited

U.S. PATENT DOCUMENTS

| | | |
|---|---|---|
| 4,052,944 A | 10/1977 | Jennings |
| D310,677 S | 9/1990 | Stidham et al. |

(Continued)

FOREIGN PATENT DOCUMENTS

| | | | | |
|---|---|---|---|---|
| CN | 103904782 A | * | 7/2014 | ............ B60R 11/02 |
| CN | 211377623 U | * | 8/2020 | |

(Continued)

*Primary Examiner* — Brian Ngo
(74) *Attorney, Agent, or Firm* — Scott D. Swanson; Shaver & Swanson, LLP

(57) ABSTRACT

A stand for a portable media device having a cap attached to a base. The base has body having a series of openings through which ballast is allowed to flow when the stand is being positioned. The ballast preferably made up of beads, such as glass or plastic, or sand. The ballast and the base are positioned within a bladder that is preferably a stretchy or resilient material. A rounded conical cap is attached to the top of the bladder and partially encapsulates the bladder. The cap is configured for positioning of a portable media device on the cap and/or for attachment of a portable media device to the cap. The cap serves to provide structure to the rounded bladder as well as to distribute the weight of a portable media device positioned on the cap. The cap has preferably a magnetic mechanism that is configured to magnetically attach to a portable media device or to a magnet position within a portable media device or affixed to the portable media device or a case on the portable media device. Alternate mechanical attachment mechanisms can be utilized in addition to or in alternative to the magnetic attachment. Preferably a bottom side of the bladder has a gripping surface that allows the bladder to be positioned on a surface and to increase friction between the bladder and the surface on which it is positioned. Preferably the stand is provided with a charging mechanism to charge a portable media device. The charging mechanism can be a wired and/or wireless charging mechanism. Preferably the stand has a port that is configured for receiving wired electricity from an external source.

19 Claims, 10 Drawing Sheets

(51) Int. Cl.
*H04M 1/04* (2006.01)
*G03B 17/56* (2021.01)

(56) References Cited

U.S. PATENT DOCUMENTS

| | | | |
|---|---|---|---|
| 7,988,106 | B2 | 8/2011 | Carnevali |
| D654,751 | S | 2/2012 | Newnam |
| 8,757,374 | B1 * | 6/2014 | Kaiser ..................... G06F 1/166 |
| | | | 248/346.03 |
| 8,882,062 | B2 * | 11/2014 | Piccolo ................ F16M 13/022 |
| | | | 248/176.1 |
| 10,028,601 | B2 | 7/2018 | Lo |
| 10,067,409 | B2 | 9/2018 | Elias |
| 2014/0054426 | A1 * | 2/2014 | Burns .................. F16M 11/125 |
| | | | 248/122.1 |
| 2014/0325818 | A1 | 11/2014 | Mayfield |
| 2015/0133022 | A1 | 5/2015 | Ushiba et al. |
| 2016/0066717 | A1 | 3/2016 | Schneider |
| 2016/0219727 | A1 * | 7/2016 | McMahon ............. F16M 13/00 |
| 2019/0116680 | A1 | 4/2019 | Ng |

FOREIGN PATENT DOCUMENTS

| | | | |
|---|---|---|---|
| EP | 2520845 | B1 | 12/2013 |
| UA | 84784 | U * | 10/2013 |

\* cited by examiner

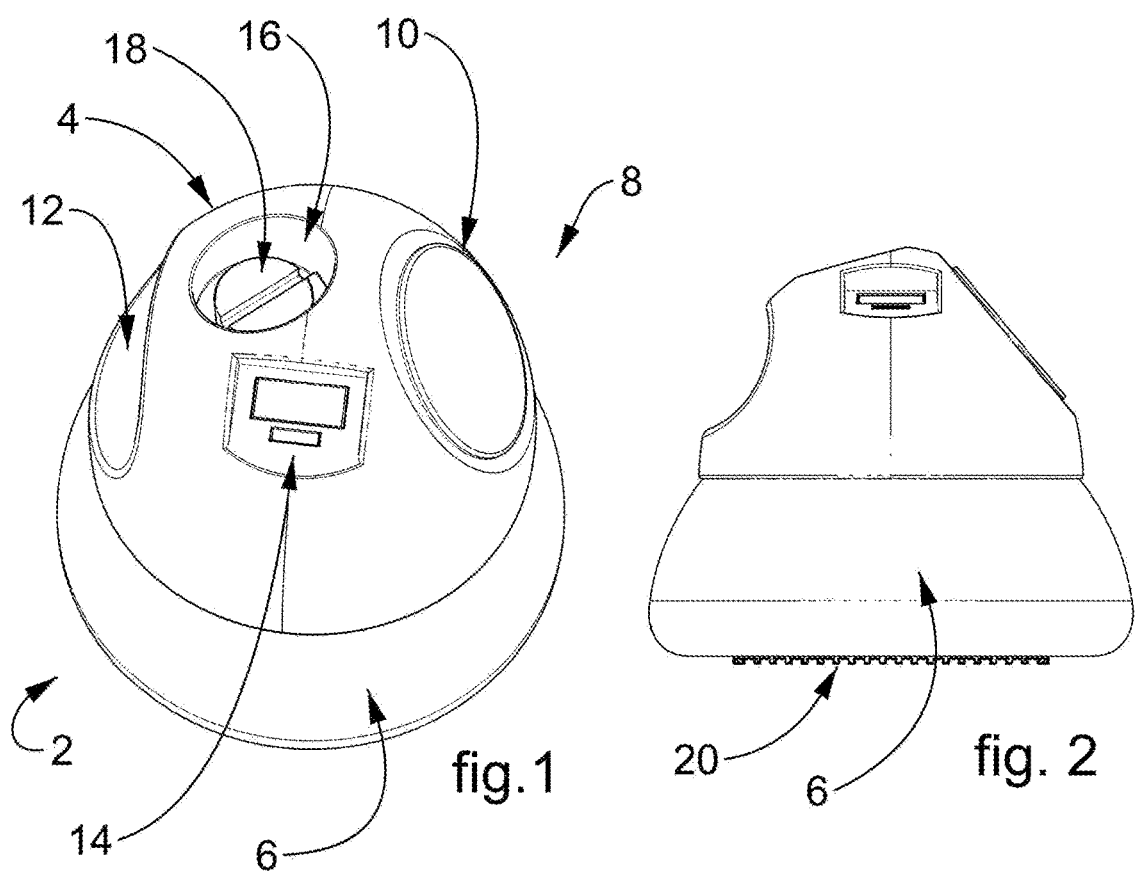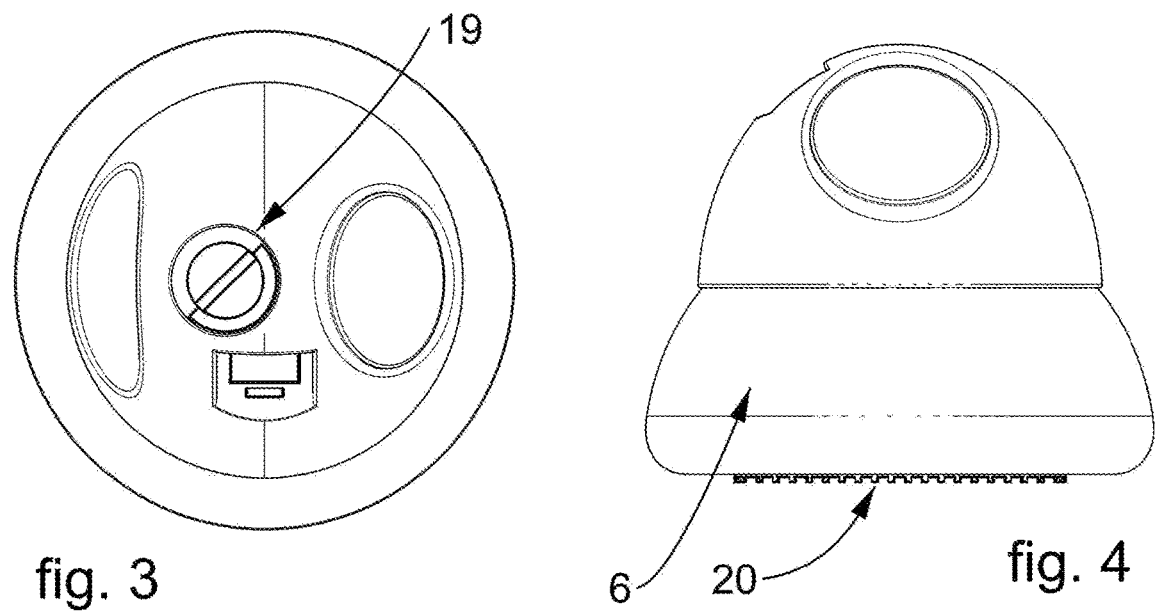

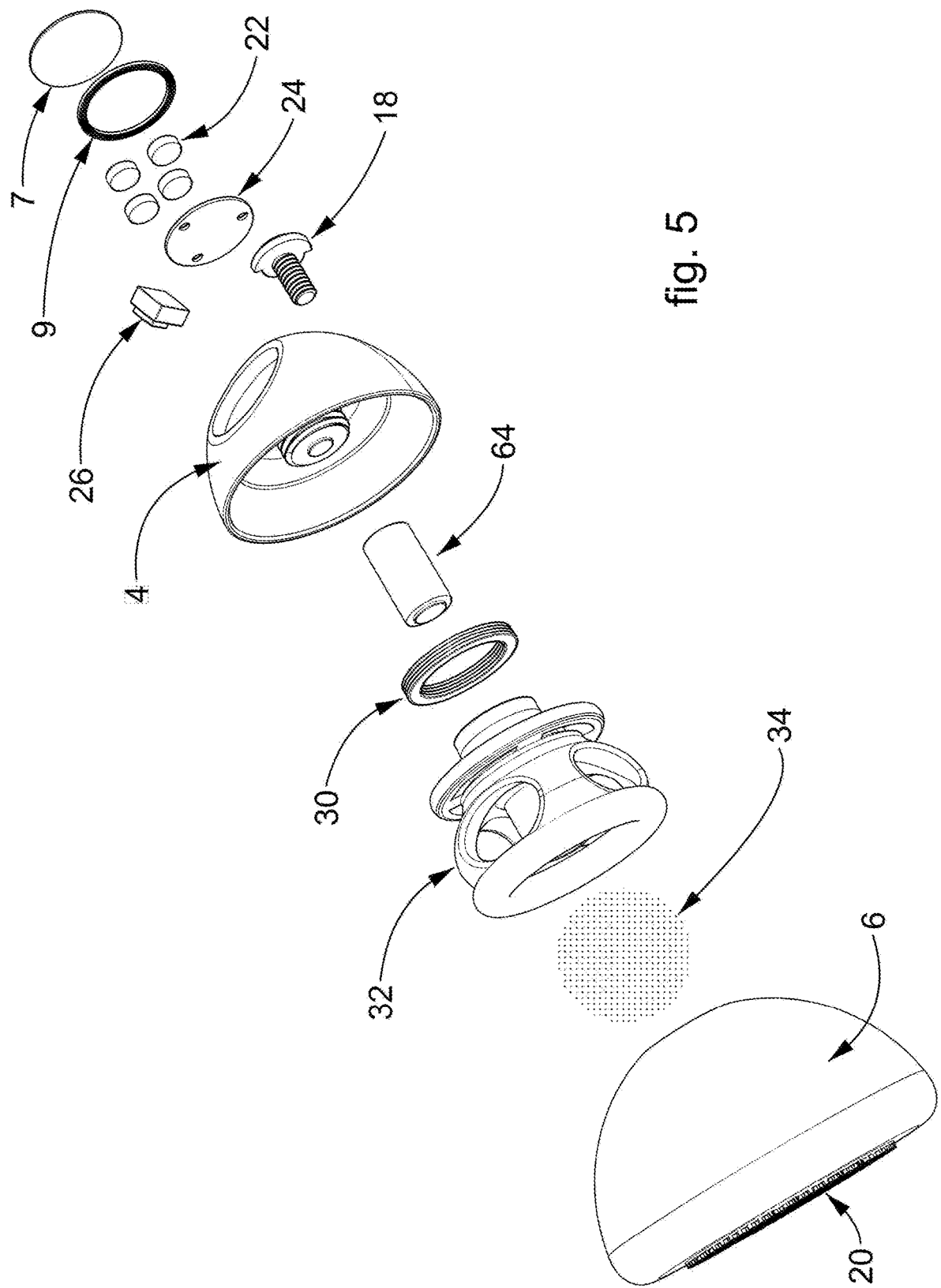

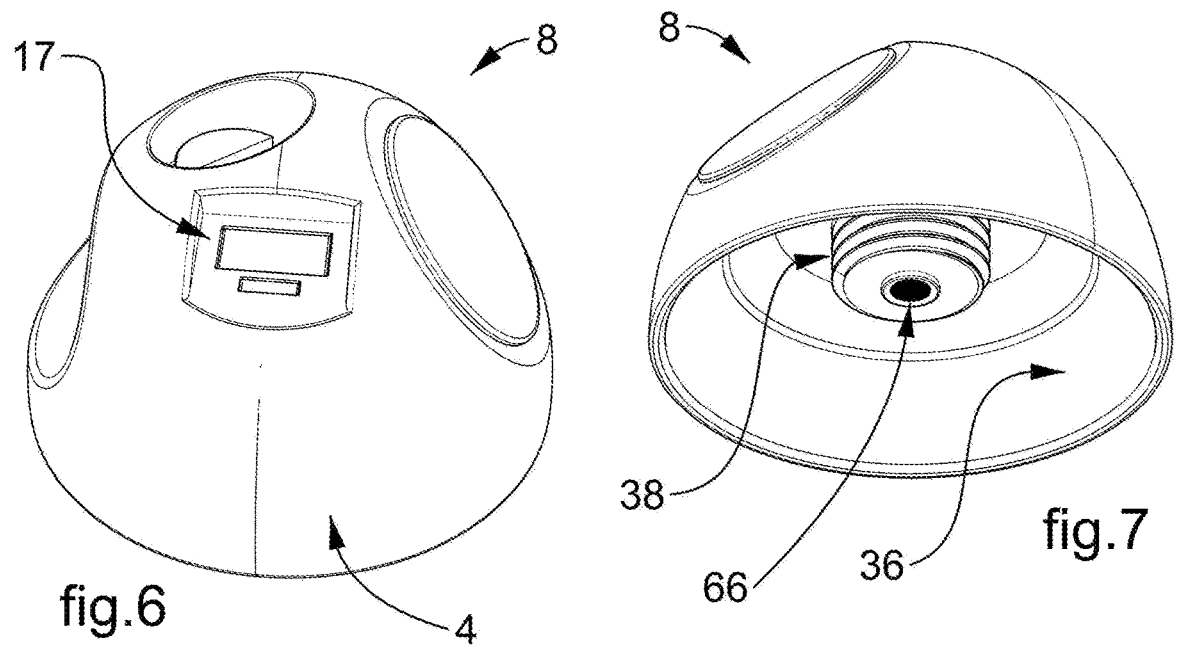
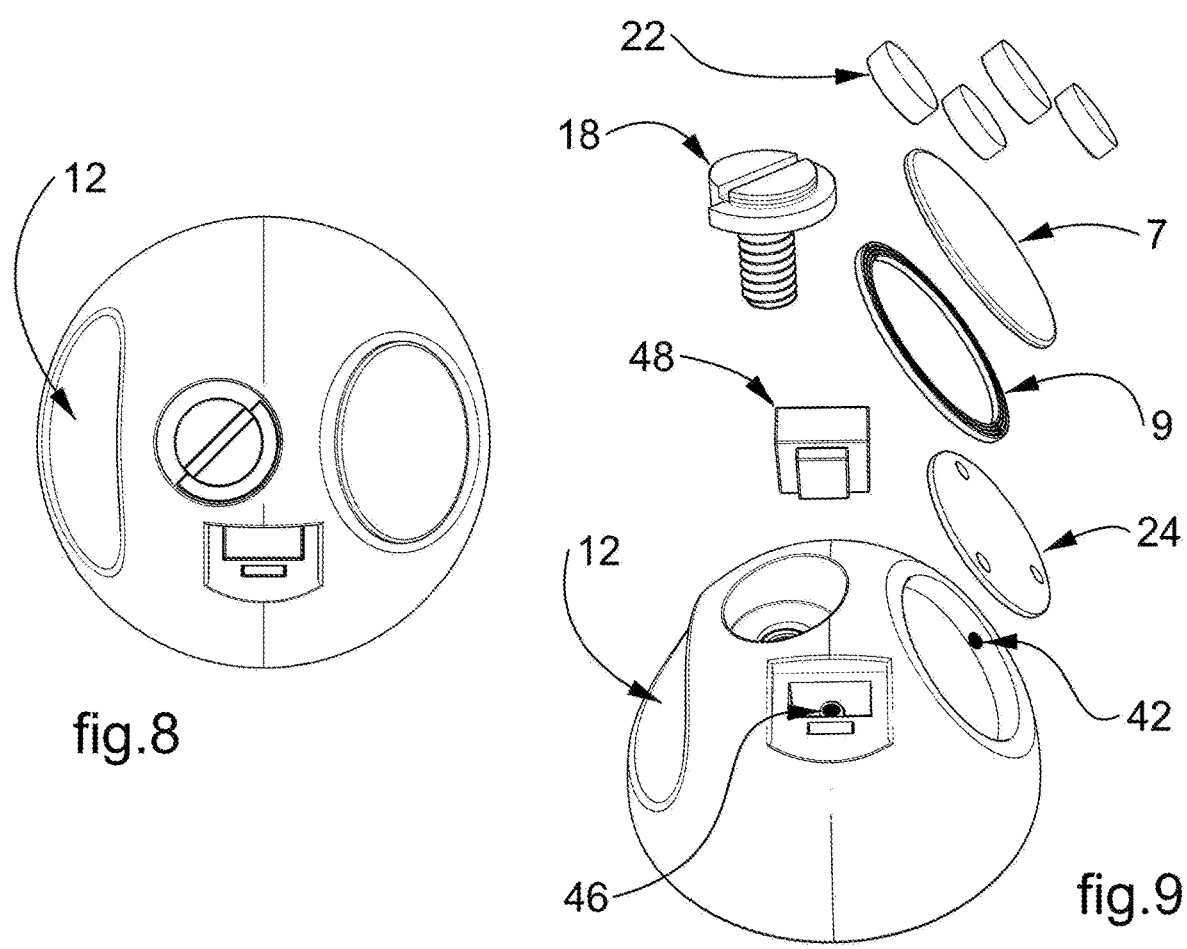

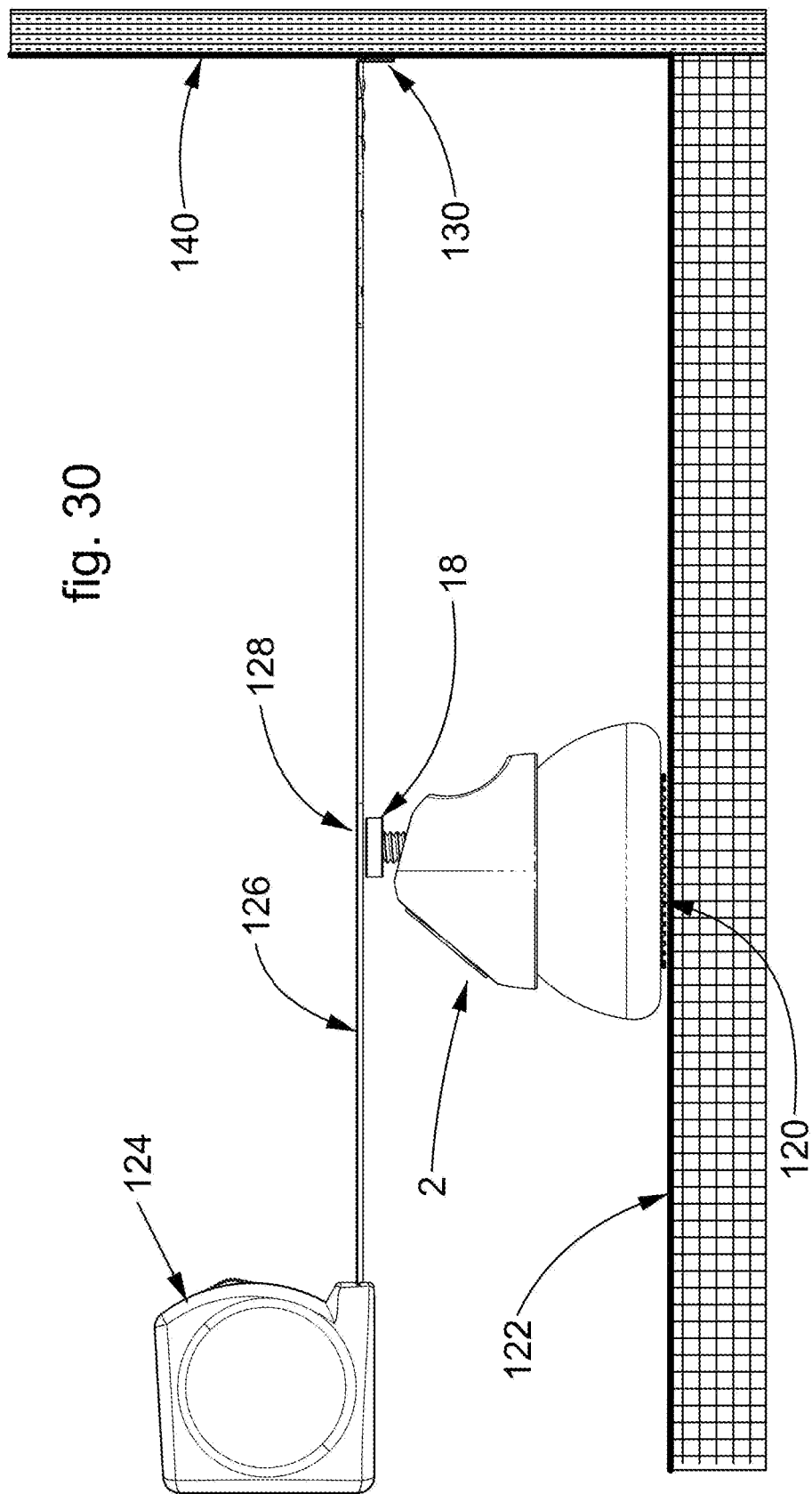

1

STAND MOUNT GRIP SYSTEM

PRIORITY/CROSS-REFERENCE TO RELATED APPLICATIONS

This application claims the benefit of U.S. Provisional Application No. 62/987,315, filed Mar. 9, 2020, the disclosure of which is incorporated by reference.

TECHNICAL FIELD

The present invention relates to mobile apparatuses for positioning and anchoring a device or object to a surface. More specifically the invention relates to a portable, freestanding platform anchoring system that is capable of anchoring and positioning a device or object passively.

BACKGROUND

Trends and interest in the personal device market (cell/smart phones, cameras, and tablets, Global Positioning System ("GPS") device systems, mobile devices and the like) represent one of the fastest growing markets in the world. The accessories for these devices can provide protection, versatility, positioning, anchoring, docking, stability and the portability for use in many environments and locations. The accessories typically include tripods, stands, mounts and cases.

Technological advances have allowed smart devices, and the users, the ability to interact hands free by audio, visual, and/or wireless controls of devices or objects. These same technological advances in the smart device industry are providing users a video and audio experience (recording/onsite/on set/studio/post production) that is of professional if not studio quality. However, to fully utilize the technology of a device or object there must be stable platform that is versatile and can quickly set the devices into optimal positions that are required to realize technology of these products without sacrificing the inherent mobility or portability of the device or object.

Many accessories have been developed for devices and objects such as tripods, mounts and stands. However, none of the accessories known to the inventor provide the necessary versatility and positioning and attributes that can fully optimize the technology without compromising the inherent mobility/portability of the smart device accessorized. The accessory drawbacks based on limited, impractical and/or complicated positioning, anchoring, or locking systems do not allow the capabilities of the device or object to be optimally used or realized; more importantly, these drawbacks severely diminish and/or completely remove the inherent portability of the device or object itself.

Accordingly what is needed is an improved freestanding stand or mount for holding a portable media device in a user operable position and that is easily positionable and stable when a portable media device is held by the stand.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The mobile system conforms to virtually any surface, some embodiments can be used in any weather, any environment and even underwater as all of the components of these embodiments are waterproof. Further embodiments include charging capability for charging portable media devices. The mobility, stability, and angle locking attributes of the mobile system provide optimal use of a device or object with minimal effort, without having to attach or manage any locking and positioning mechanisms or components. The innovative mobile system allows for optimal interaction of a device or object by any individual (including those of disabled or limited physical capacities), at almost any age, anywhere, on and in varying locations, including in vehicles (land, water and air), at home (kitchen, entry, bedroom, home, deck, table, floor, counter, office, living, bathroom, grass, dirt, mud, outdoor living areas and pool), at an office (desktops), at schools (classrooms and homework use), at construction sites (interior or exterior areas), at industrial locations such as shops and garages, at sport facilities and fields, and on sand at the beach. The mobile system allows a user an optimized interaction with a device or object with limited or no physical interaction. The mobile system can be held or placed when used. When held, the mobile system is configured to provide ergonomic as well as therapeutic benefits when interacting with a device or object. When placed, the mobile system provides optimal interaction with a device or object with limited and/or no physical interaction requirements for touch controls, audio, visual, and/or wireless controls. The mobile system provides limited or one handed use for an object or device that gives the user a "third hand" as well as a true "hands free" use as the optimal placement and angles of the device or object. The mobile system's design and positioning system provides optimal angles for face and audio interaction with a device or object thus providing the user ideal use through video and audio recognition software.

The mobile system preferably has at least four components, including but not limited to: the cap, the base, the bladder, and the ballast. The cap can be of any shape or design but preferably being formed as a rounded conical top having a substantially spherical interior shell. The cap interior is preferably concave and provides symmetrical reflecting resistance to the bladder during positioning and placement which is part of the positioning system. An object or device is either temporarily or permanently attached magnetically or mechanically to the cap. The cap preferably includes a magnet or is configured to attach a magnet to attach a device. The cap can be configured to be removably attached to the base or alternatively permanently attached to the base.

The base can be configured in a variety of shapes provided the shape provides the capability of the ballast to flow into and around the base to anchor the base in the ballast. The base includes a body that transitions into a neck. A disk can be positioned between the body and the neck to provide further anchoring of the body in the ballast. The bladder attaches to the base at the neck. The lower portion of the body provides a cylindrical ring structure that functions to allow the base to rest on a portion of the ballast such that the ballast is positioned below and throughout the base. The lower portion of the base can utilize a combination of solids, hollows and ballast traps that are part of the positioning and locking system. The bladder contains the ballast and is preferably permanently attached to the neck of the base. The bladder material and elasticity can be variable. The bladder ensures mechanical resistance and restriction of the ballast to the base which is part of the positioning system.

The ballast material is preferably a granular material, including but not limited to, gravel, sand, metal pellets, dense plastic, or any other material that provides stability to the mobile system. The ballast material is configured to conform to the surface, the cap, and the base due to the reflecting and restrictive physical force (both fundamental and non-fundamental) from the surface of placement, the bladder, the base, the cap, the device or object, and the combined mass (weight). The adjustment, positioning and/or placement of the embodiments of the mobile system essentially liquefies the ballast inside the bladder due to the granular attributes. The ballast then solidifies due to the same and aforementioned forces and design which quickly and effectively locks in the base, the cap and the attached device or object into the optimal location, angle and position and which is part of the positioning system.

The object or device is attached to the cap of the assembled system; before or after placement. During placement a user will adjust the object or device to a preferred angle and position for optimal and ease of use. During the placement the ballast is disturbed and put in a liquefied state. This allows for the ballast to conform to the base, the ballast traps, and the surface of placement. At the termination of the placement, the ballast solidifies and effectively anchors the base into position because the ballast traps, the reflecting forces, the mass, the surface shape of placement and the bladder all work to allow the ballast to have a unique restrictive effect on the attached device or object which is held into place by the cap, which is attached to the base. The forces exerted on the ballast by the combined mass, surface of placement, the bladder and gravity, during placement or adjustment provides the stability against the downward, horizontal forces, and movements about both the horizontal and vertical axes. Gravity, use, and the four components of the system provide optimal articulation and position for a variety of objects or devices on a wide variety of surfaces.

The stand is preferably a freestanding apparatus for holding a personal electronic device. The stand has a base. The base has a body and a neck extending from the body. The body is preferably a semi spherical shape having a first end and a second end and defining a plurality of apertures formed in the body. While a semi spherical shape is preferred, equivalent shapes can be utilized with apertures that allow for the ballast to flow through the body and to solidify within the body, effectively anchoring the body and the device. The neck extends upward from the body at a second end of the body, while preferably the downward or first end of the body is configured to rest upon solidified ballast material. The base can optionally have a ring positioned between the neck and the body to provide further weight distribution into the ballast.

The stand utilizes a flexible bladder that surrounds the base. The base is positioned within the bladder such that the neck of the base extends upward to, and in some embodiments through, an opening in the bladder. The is attached to the neck of the base, preferably by a retaining clip or string tying the bladder to the neck.

The stand has a hollow rounded conical cap attached to the neck of the base and positioned external of the bladder. The rounded conical cap is attached to the neck and encapsulates the upper portion of the bladder. The rounded conical cap provides an external structure to the upper portion of the bladder. Preferably the cap is attached to the base at the neck. The cap can be removably or permanently attached to the neck. Examples of removable connection would be a magnetic connection, while example permanent connections include adhesive connection, attachment by a screw securing the cap to the base, or if the neck and the cap are integrally formed. The neck can be configured with a female opening at the top of the neck (also called the first end of the neck) and a post extending from the underside of the rounded conical cap. The post matingly engages with the female opening in the first end of the neck. The post and the female opening can be configured with threaded connections between the two, magnetic connection, adhesive connection, or other connection. Alternatively the female opening can be positioned on the extension in the underside of the cap.

The cap is configured for mounting thereon of a portable media device, preferably by a magnetic configuration. Alternative connections can be utilized such as hook and loop, snap fit, threaded connection, or other attachment mechanism. Preferably the cap has a finger groove to facilitate grasping of the cap. Preferably the finger groove is on the opposite side of the cap.

The bladder is filled with a ballast. The ballast is a granular fill material configured to flow through the apertures in the body and around the body within the bladder. The ballast is configured to solidify in the apertures in the body and around the body to secure the stand when the stand is positioned on a surface by a user. The ballast can be pellets, beads, balls, salt, sand, or other suitable material, with the currently preferred ballast material being glass beads. The bladder is a flexible material, and preferably an elastic material, to facilitate change in shape of the bladder with repositioning of the ballast.

The stand can be configured with a charging system configured to charge a wireless media device positioned on the apparatus. This charging can be via wireless or wired connection. Preferably the stand will have a connection port to an external power source. The stand can have a battery positioned within the stand. The battery preferably is rechargeable.

The stand preferably can have one or more mounting mechanism for mounting a portable media device to the stand. A preferred option is that the rounded conical cap has a planar edge (or beveled edge) formed in the side of the rounded conical cap. The planar edge is configured for attachment to a portable media device at the planar edge such that the back of the device rests on the planar edge. One or more magnets can be positioned in or at the planar edge to magnetically secure the portable media device to the planar edge. For example, the magnet(s) can be positioned in recession in the planar edge that houses a compartment housing the magnets. Alternative attachments can be utilized to secure the portable media device on the planar edge.

A second mechanism for attaching a portable media device can be utilized in addition to or as an alternative to the planar edge. The rounded conical cap can be configured for attachment to a portable media device by a threaded post attached to a portable media device threading into a threaded female recess positioned in the cap. This mating engagement secures the portable media device to the cap. Preferably in this embodiment a screw is provided that occupies the threaded recess when the threaded recess is not being used for attachment of a portable media device. The screw can be provided as a hinged loop that functions as a hook to allow the device to be utilized, for example, as a plumb bob. Alternatively a loop or hook can be formed into the cap itself.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF THE DRAWINGS

FIG. 1 is a perspective view of a preferred embodiment of the invention.

FIG. 2 is a side view of a preferred embodiment of the invention.

FIG. 3 is a top view of a preferred embodiment of the invention.

FIG. 4 is a side view of a preferred embodiment of the invention.

FIG. 5 is an exploded view of a preferred embodiment of the invention.

FIG. 6 is a perspective view of a cap of a preferred embodiment of the invention.

FIG. 7 is a bottom perspective view of a preferred embodiment of a cap of the invention.

FIG. 8 is a top view of a preferred embodiment of a cap of the invention.

FIG. 9 is an exploded view of a preferred embodiment of the cap of the invention.

FIG. 30 illustrates an alternative use of a preferred embodiment of the invention in supporting a tape measure and measuring a distance.

DETAILED DESCRIPTION OF THE PREFERRED EMBODIMENTS

Figures 10, 11:
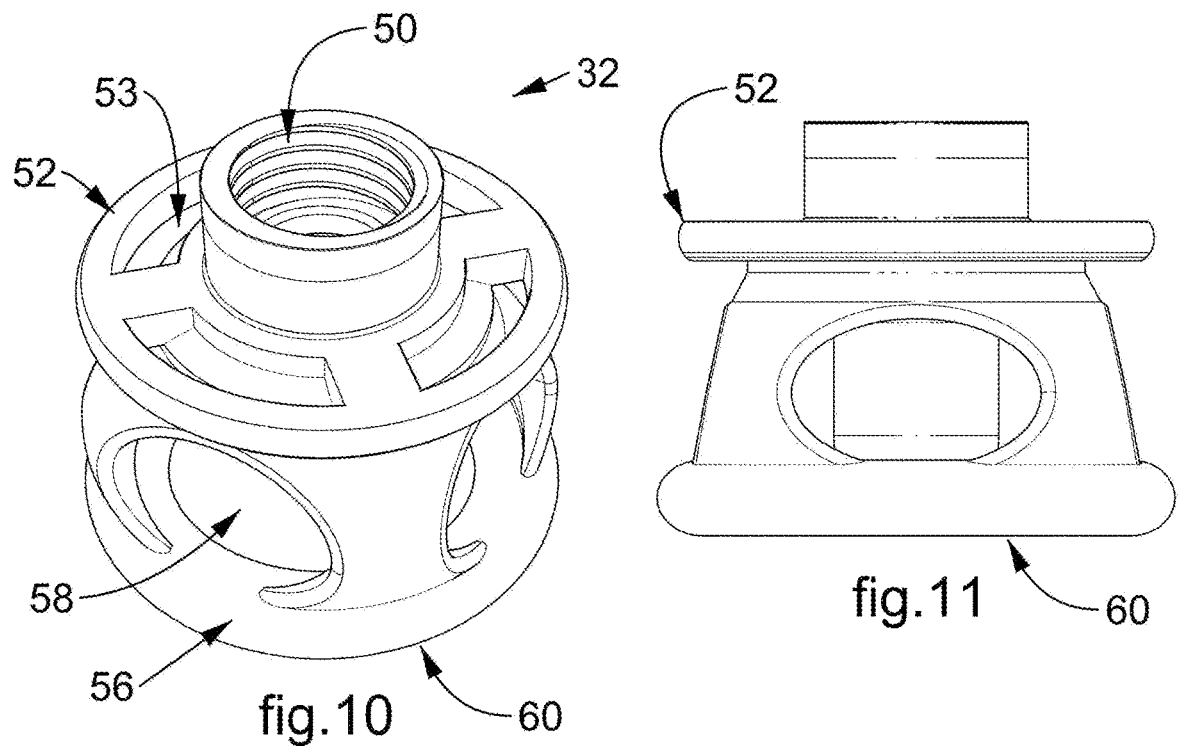
FIG. 10 is a perspective view of a preferred embodiment of the base of the invention.
FIG. 11 is a side view of a preferred embodiment of the base of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIGS. 1-5 illustrate a preferred embodiment of the invention. FIG. 1 illustrates a preferred embodiment of the invention. The invention utilizes a bladder 6 attached to a rounded conical cap 4. In preferred embodiment, the rounded conical cap utilizes a magnetic attachment 8 configured for attaching a portable media device. Preferably this magnetic attachment 8 is positioned in or on a planar edge 10 (or beveled edge) of the rounded conical cap. In general, a portable media device can either have a magnetic surface or a magnet or magnetically attractive can be inserted into a case surrounding the portable media device. This allows the back of the portable media device to be affixed to the stand 2 at the magnetic attachment 8. The planar or beveled edge provides a flat surface for mounting on a portable media device. In a preferred embodiment, the portable media device has a battery positioned within the stand to all the stand to function as a portable charging unit. The battery is preferable charged through port 14.

A second mounting mechanism utilizing a threaded recess positioned in the rounded conical cap for attachment of a threaded post attached to a portable media device can be provided in addition to or as an alternative to the planar edge. Preferably a screw 18 is positioned within the threaded recess. Preferably the screw 18 positioned within the recess 16 has a hinged connection loop 19. As discussed below, the hinged connection loop (also called a hook) can be utilized to attach the stand as a plumb bob to a string to allow for hanging the stand and mounting a portable media device.

Preferably the rounded conical cap has a finger groove 12 configured for one or more of a user's fingers to be positioned in the groove when holding the stand. The finger groove facilitates a user grasping and manipulating the stand.

The rounded conical cap is attached to a base 4 (further detailed, for example, in FIG. 5) that is positioned within a bladder 6. The bladder is filled with ballast. The ballast preferably is made up of sand or glass or plastic beads. The ballast material is flowable inside of the bladder to allow the bladder to be positioned and configured in an orientation preferable to the user. The ballast provides a fluid movement when moved and when the bladder is positioned the ballast solidifies to provide a solid platform. The bladder is preferably made of an elastic material such that the bladder can stretch and rebound with movement of the ballast therein. Preferably the bladder has a textured or otherwise friction increasing material 20 affixed to or integral with the bottom of the bladder to facilitate retention of the bladder on a surface, such as on the dashboard of a vehicle in motion.

The rounded conical cap is provided in a rounded conical shape with a hollow inside, as shown in FIG. 7. Utilizing this structure allows the rounded conical cap to fit over (or encapsulate) the upper portion of the bladder and ballast providing a structure that limits the expansion of the upper portion of the ballast and bladder. The rounded conical cap further serves to distribute the weight of the portable media device onto the bladder and ballast to provide increased stability.

FIG. 5 illustrates an exploded view of a preferred embodiment of the invention. Positioned within the bladder 20 is the ballast 34. The ballast is positioned in and around a base 32 that is configured to stabilize the mount. The base is provided with a body having a semi spherical shape defining a series of openings 58 in the wall 62 of the base through which the ballast is allowed to fluidly move and solidify when the base has been positioned in a location. The openings serve as an anchor for the top into the ballast. The base is connected to the rounded conical cap by a neck 51 extending upward from the body of the base. A post 38 extends downward from the underside 36 of the rounded conical cap for mating engagement with an aperture at the top of the neck.

A battery 64 is shown housed in an upper opening of the base. The battery is further illustrated in FIGS. 10 and 12. Preferably the battery is rechargeable. In a preferred embodiment, the base is configured for wireless charging of a portable media device, either via the battery, a connection to an external power source, or both. Alternatively or in addition to wireless charging, the base can be configured for wired charging. A port 14 is provided as shown for example in FIG. 1 for wired connectivity at the base to an external powered source or fore wired connection for charging a portable media device.

Preferably the magnetic attachment at the base is provided with a depression 21 in the planar edge of the rounded conical cap. The depression houses a compartment for a magnetic element for attachment of a portable media device to the stand. In the depicted embodiment the compartment includes a floor 24 supports and provides for structure for adherence of a series of magnets 22. A wireless charging induction coil 9 is positioned to facilitate wireless charging of a portable media device positioned on the stand. The wireless charging induction coil receives power via port 42 (shown in FIG. 9). A charging module 26 is shown for providing power to the wireless charging coil or directly to the phone via a battery and/or via an external power source connected to the stand. A flat compartment cap 7 encloses the batteries in the compartment.

FIGS. 6-9 illustrate a preferred embodiment of a rounded conical cap. The rounded conical cap is provided in a rounded conical shape, or alternatively called a partial spherical shape. The rounded conical cap 4 preferably has a port 17 configured for wired attachment to an external power source and/or for wired connection to a portable media device to be charged on the rounded conical cap. In a preferred embodiment the rounded conical cap has a post 38 configured for attachment to the neck (51 shown in FIG. 10) of the base. In the depicted embodiment the rounded conical cap is configured to threadingly attach to the neck of the base. A charging module 48 inserts into a port 46 providing a port for supplying power to the battery and/or charging unit of the stand.

The rounded conical cap is depicted with two attachment mechanisms for retaining a portable media device on the rounded conical cap. The first attachment mechanism is the planar edge in the side of the rounded conical cap, while the second attachment mechanism is the threaded recess, shown with a screw 18 positioned therein in FIGS. 6-8. The first attachment mechanism is shown with a portable media device attached thereto in FIGS. 16-26. The second attachment mechanism is shown with a portable media device attached thereto in FIGS. 27-29.

Figure 12:
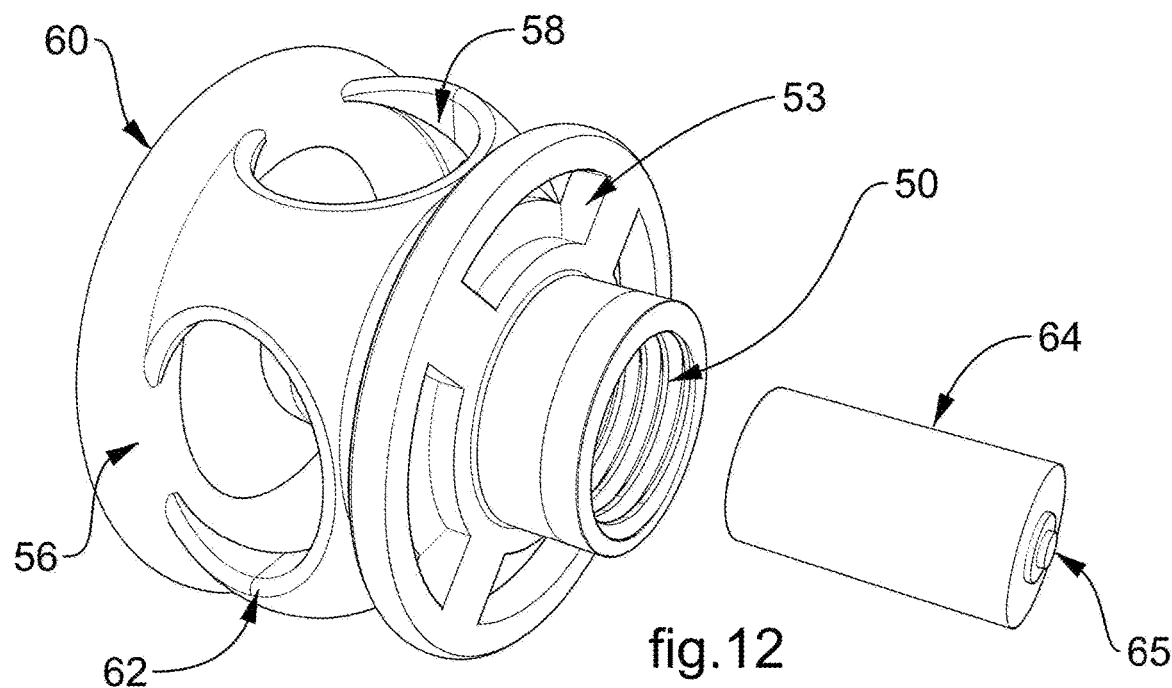
FIG. 12 is a partially exploded view of a preferred embodiment of a base of the invention showing a battery exploded from the base.

FIGS. 10-12 illustrate a preferred embodiment of the base has a neck extending upward from the body of the base. The neck 51 has an aperture 50 that is configured for threaded engagement with the threaded post of the rounded conical cap. In the depicted embodiment, the base extends downward from the neck. The base has a series of openings and a generally tubular base section or support 60. The body 56 of the base is configured such that the ballast is able to flow through the base and into the base and act as an anchor of the base. The disc between the neck and the body enables further anchoring of the body in the ballast. The disc 52 has a series of openings 53 configured to allow the ballast to flow through the openings.

In the depicted embodiment, the base is configured with a tubular base section 60 that forms a basal support. The rounded tubular appearance of the base is provided such that when it rests upon the ballast, it provides increased support to the stand and portable media device resting thereon.

FIG. 12 illustrates an exploded view of a preferred embodiment of the base with a battery 64 shown removed from the base. The female opening 50 in the base is configured to allow for a battery 64 to be positioned within the base. The positive connection 65 of the battery can then connect to a connection 66 in the post of the underside of the rounded conical cap.

Figure 13:
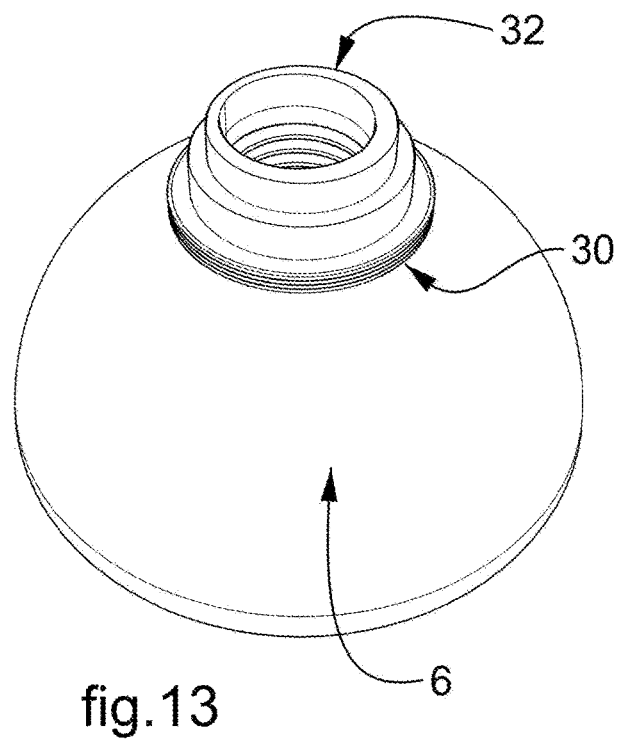
FIG. 13 illustrates a perspective view of a preferred embodiment of a base of the bladder of the invention, having a base installed in the bladder of the invention.

FIG. 13 illustrates a preferred embodiment of the bladder with the neck of the base protruding upward from the bladder. The bladder is connected to the base at the neck of the base via a clip 30. The rounded conical cap then attaches to the base by inserting the post of the rounded conical cap into the neck and threadingly engaging the threads of the post to the threads in the female opening of the neck.

Figure 14:
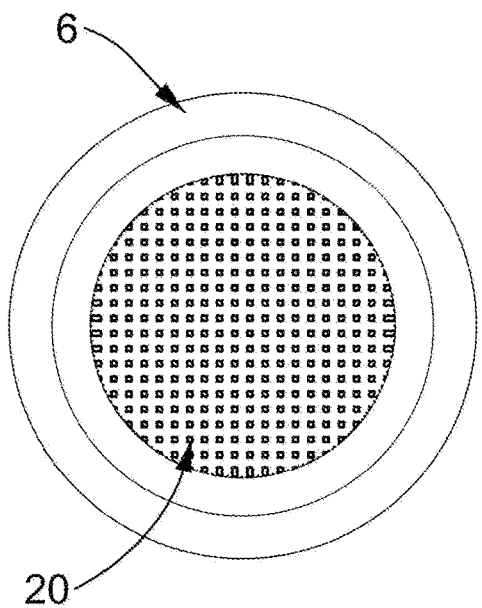
FIG. 14 is a top view of the bladder looking in at the ballast.
Figure 15:
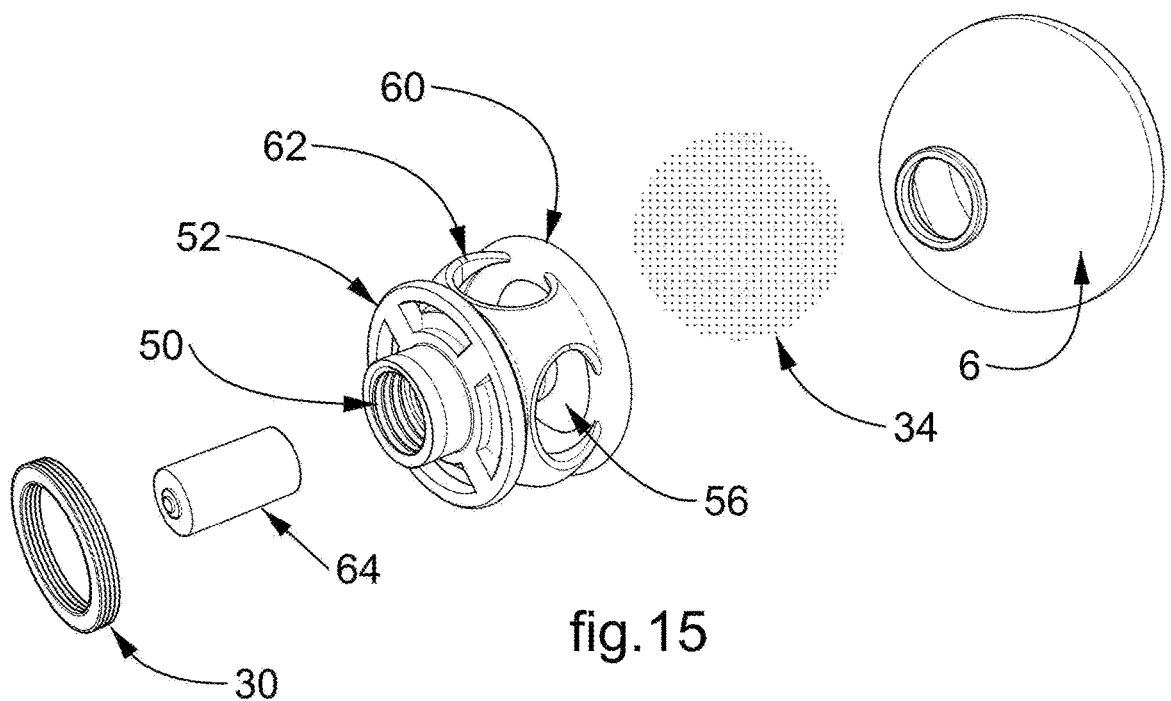
FIG. 15 is an exploded view of the bladder, ballast, base, and wireless charging element of a preferred embodiment of the invention.
Figure 16:
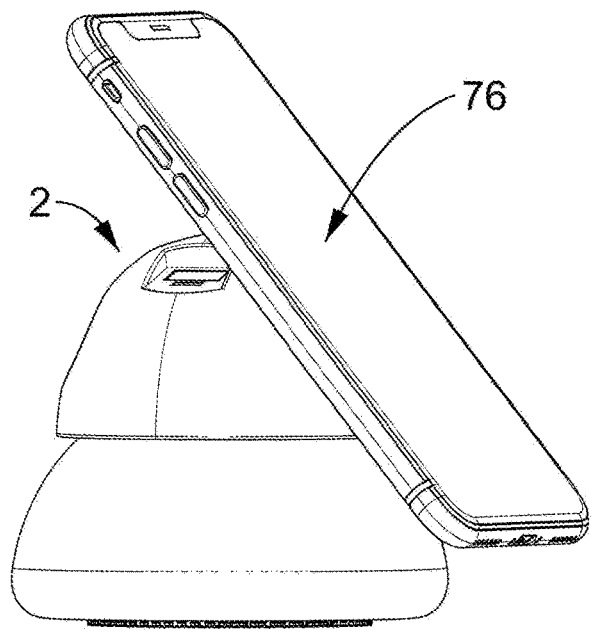
FIG. 16 illustrates preferred embodiment of the invention with a portable media deceive attached.
Figure 17:
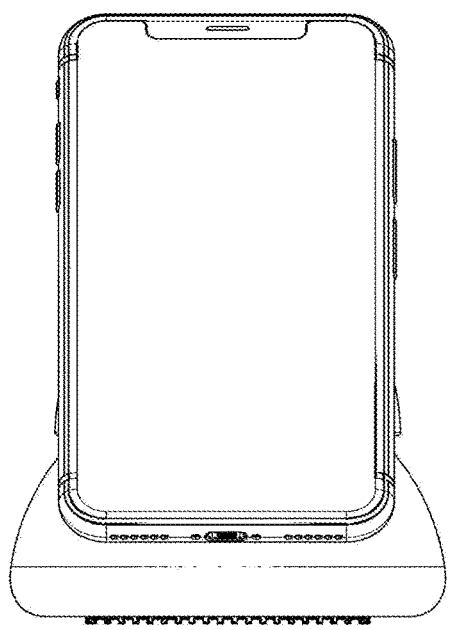
FIG. 17 illustrates a front view of a preferred embodiment of the invention with a portable media device attached.

FIG. 14 illustrates a bottom view of the bladder showing the textured or otherwise friction inducing surface 34. FIG. 15 illustrates an exploded view of the bladder 6, attachment point 72 of the bladder to the neck of the base, ballast 34, battery 64, and clip 30.

Figure 18:
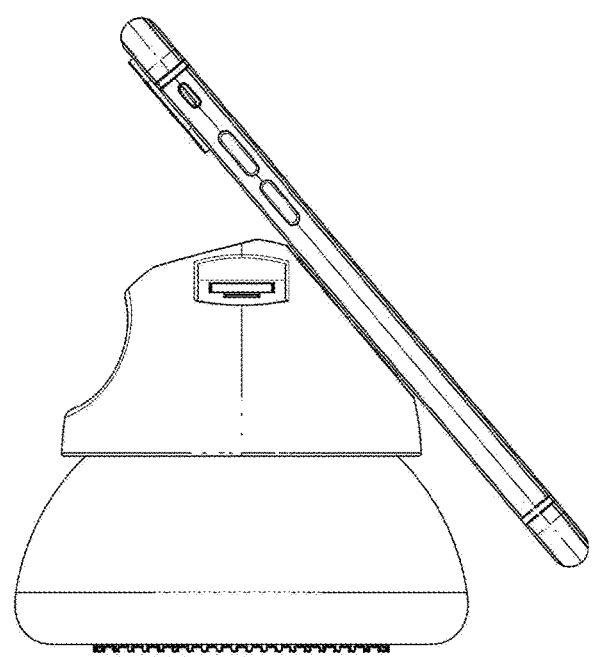
FIG. 18 illustrates a side view of a preferred embodiment of the invention with a portable media device attached.
Figure 19:
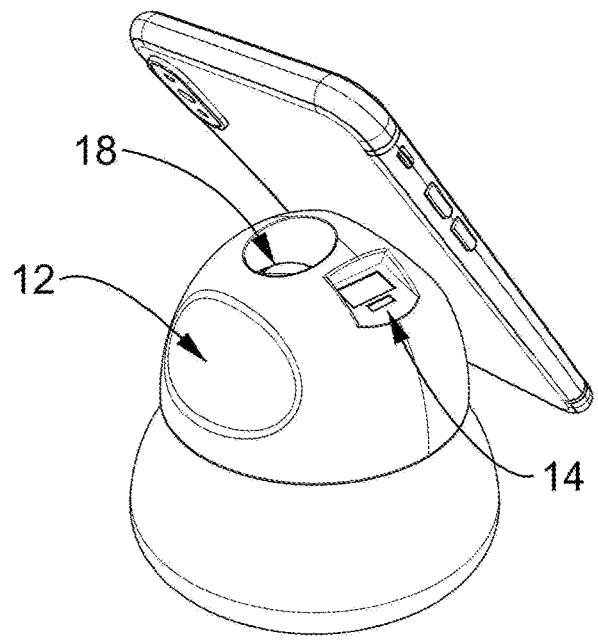
FIG. 19 illustrates a rear perspective view of an embodiment of the invention with a portable media device attached.
Figure 20:
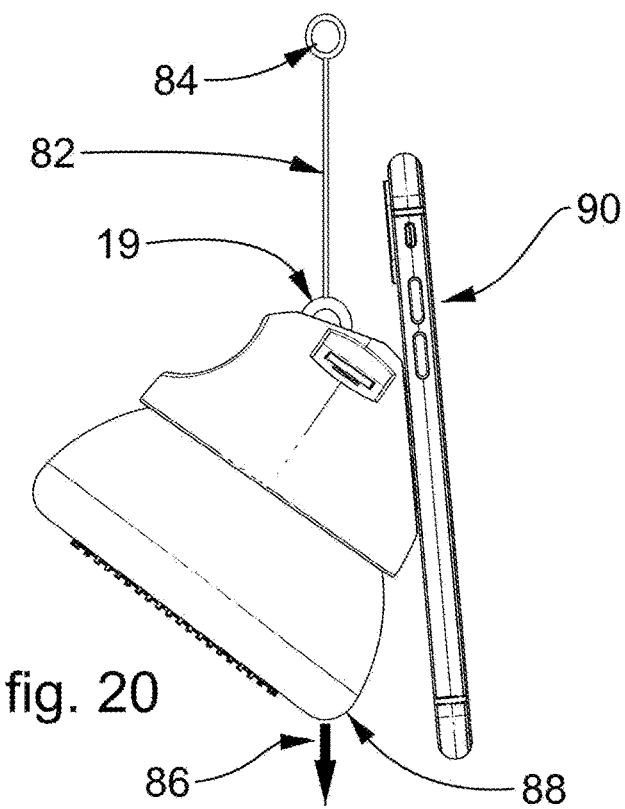
FIG. 20 illustrates a preferred embodiment of the invention hanging as a plumb bob with a portable media device.

FIGS. 16-19 illustrate a preferred embodiment of the stand 2 with a portable wireless media device 76 positioned on the stand. As illustrated in FIG. 18, the back of the portable wireless media device is attached such that the back rests on the planar side of the cap. The finger groove 12 is positioned on the cap opposite to the planar side to facilitate a user grasping the stand with the portable media device attached thereto.

Figure 21:
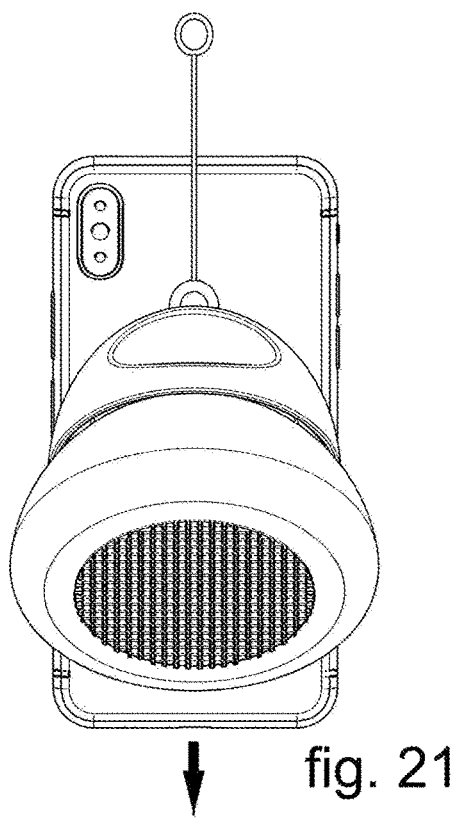
FIG. 21 illustrates a back view of a preferred embodiment of the invention acting as a plumb bob with a portable media device attached.
Figure 22:
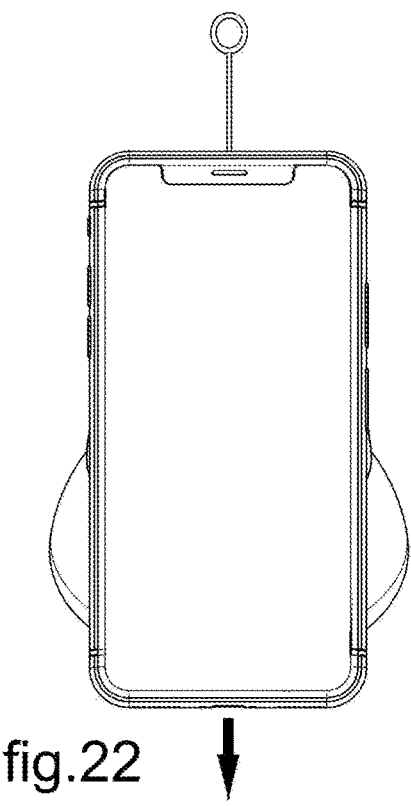
FIG. 22 illustrates a front view of a preferred embodiment of the invention acting as a plumb bob with a portable media device attached.
Figure 23:
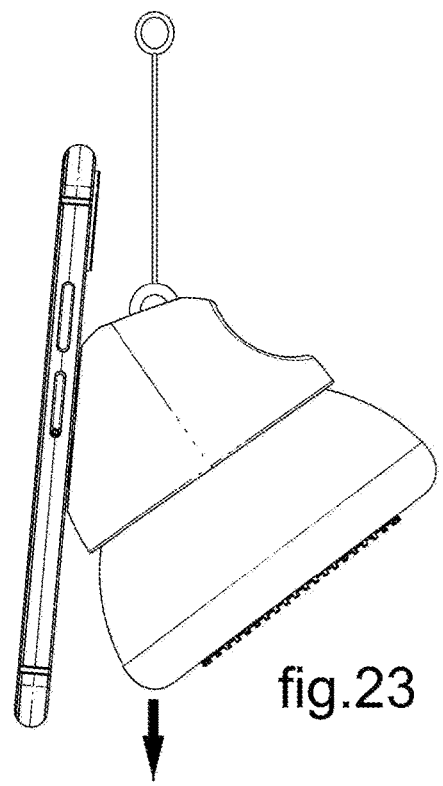
FIG. 23 illustrated a side view of a preferred embodiment of the invention acting as a plumb bob with a portable media device attached.

FIGS. 20-23 illustrate a preferred embodiment of the stand utilized as a plumb bob. A hook, 19 is provided as a hinged ring 19 attached to the screw 18 (illustrated in detail in FIG. 1). The hook is attached to a string 82 having an end 84 that can then be attached ceiling or other surface or object to allow the stand to hang from the ceiling or other surface or object. The weight of the stand pulls the device downward 86 to provide a generally vertical orientation of the portable media device 90. The configuration of the stand coupled with the portable media device puts the weight of the portable media device and stand assembly at corner 88 of the stand, providing a vertical mount. FIGS. 21-23 further illustrate the plumb bob utilization of the stand and the portable media device.

Figure 24:
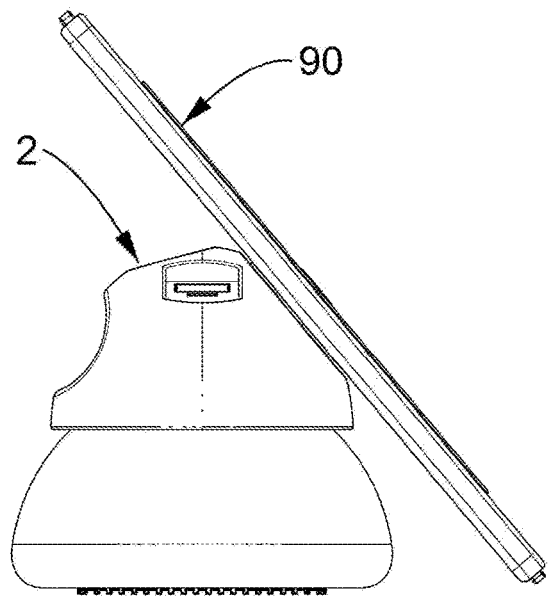
FIG. 24 illustrates a preferred embodiment of the invention with a portable media device attached, namely a tablet.
Figure 25:
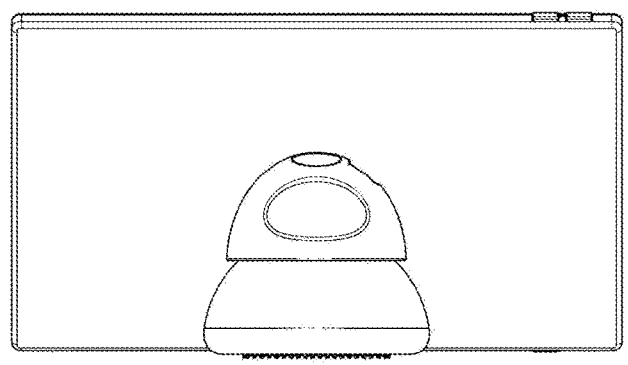
FIG. 25 illustrates a back view of the embodiment of FIG. 24.
Figure 26:
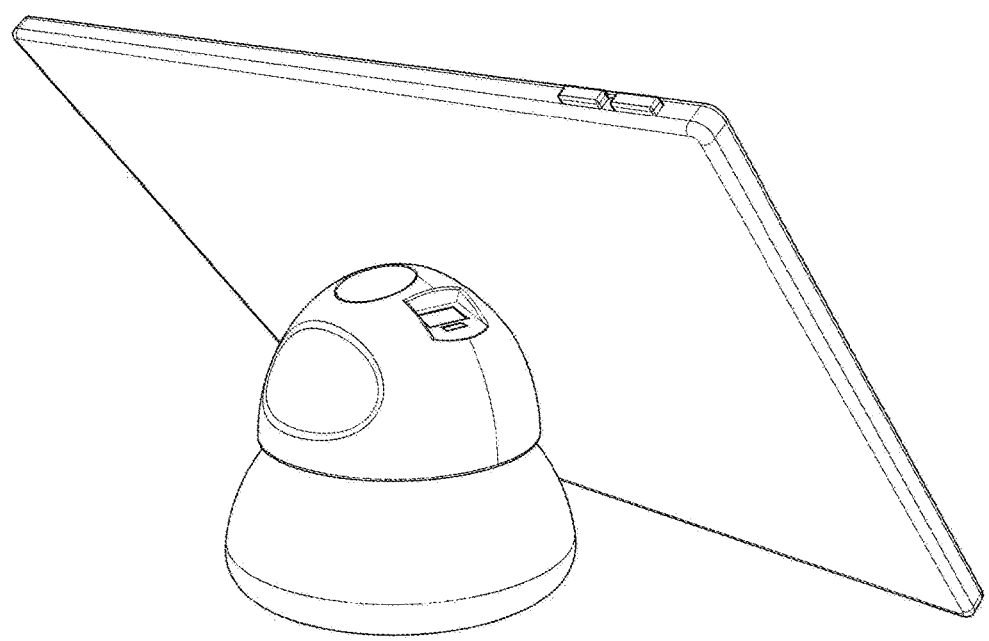
FIG. 26 illustrates a perspective view of the embodiment of FIG. 24 with a portable media device attached.

FIGS. 24-26 illustrate a preferred embodiment of the stand connected to a portable media device being a tablet. The stand is holding the tablet in a horizontal orientation. In use, the stand can either hold the tablet above the ground or the bottom edge of the tablet can be touching the ground.

Figures 27, 28:
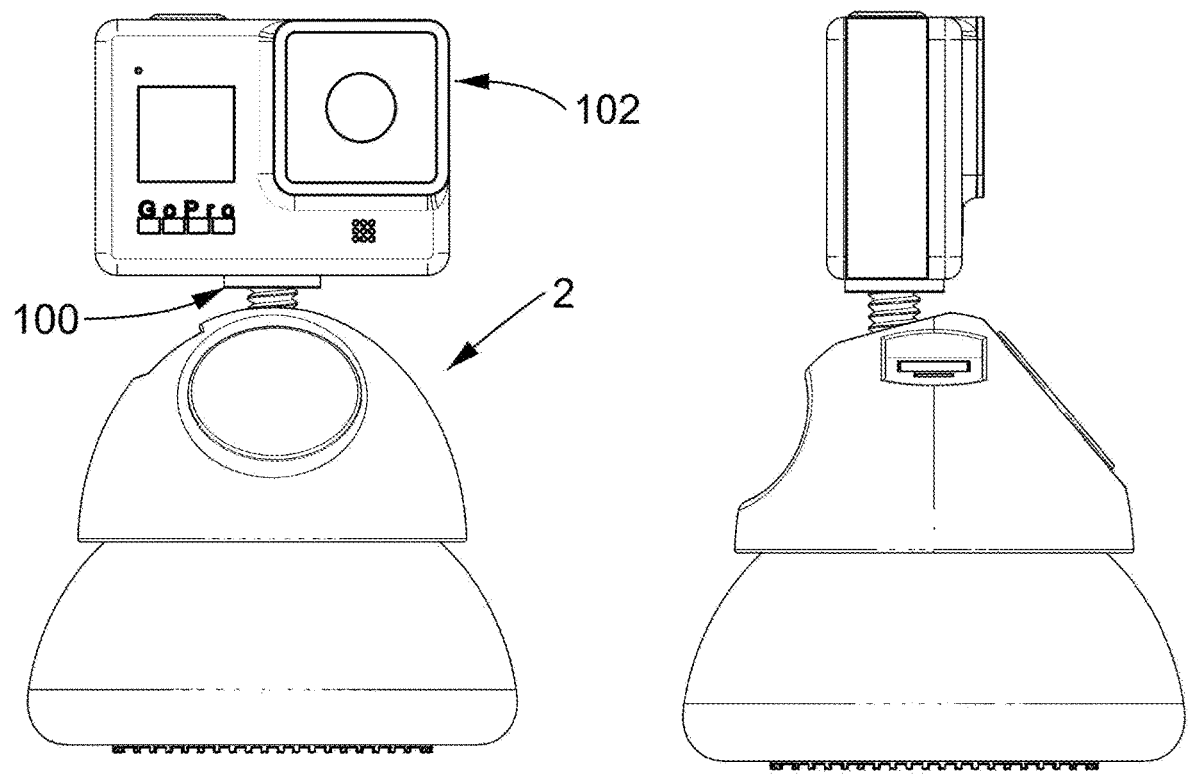
FIG. 27 illustrates a preferred embodiment of the invention with a camera attached to a threaded mounting opening.
FIG. 28 illustrated a side view of the embodiment shown in FIG. 27.
Figure 29:
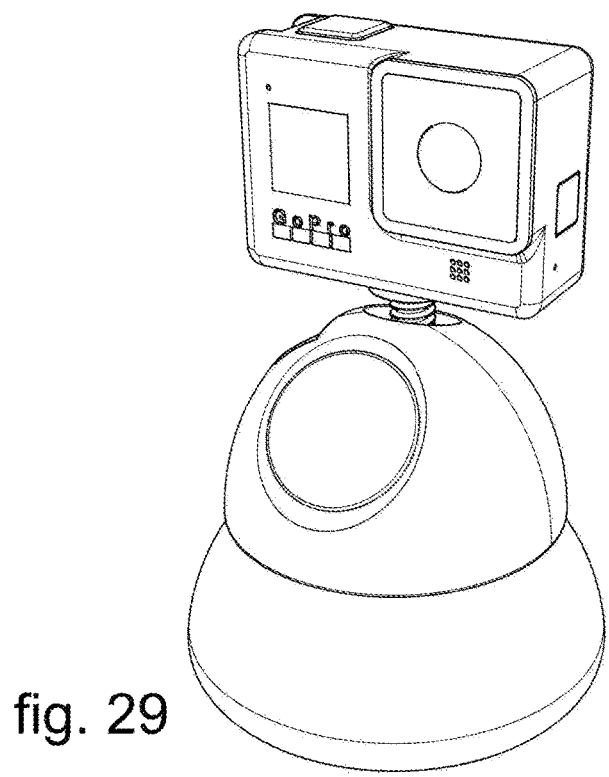
FIG. 29 illustrates a front perspective view of the embodiment of FIG. 27.

FIGS. 27-29 illustrate a portable media device being a camera attached to the stand at the threaded mounting point 16 by the rounded conical cap. The threaded screw 18 has been removed and replaced by a threaded post 100 attached to the camera 102.

FIG. 30 illustrates a further use of the stand. In FIG. 30, the stand is being utilized to assist in measuring a distance along the floor 122. The stand 2 is positioned on the floor at the gripping surface 120 of the stand. A tape measure 24 is positioned above the stand. The screw 18 has been extended upward. The tape 126 of the tape measure has been extended measuring the distance between the tape measure and the wall, or any point in between. Preferably the screw is magnetic such that the tape is held in place, allowing the user to roll out the tape from the tape measure 124. The end flange 130 of the tape measure is positioned against the wall 140. The stand is providing support at a mid-section 128 of the tape measure tape. This prevents the tape measure tape from buckling when it is extended. This allows a single user to obtain a longer measurement than the user would be able to without the device or some other implementation to allow the tape measure to extend without buckling. The use of the magnetic screw further allows a user to take a measurement while reducing the ability of the tape to retract into the tape measure because the tape is being held in an extended position by the magnetic screw.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A freestanding apparatus for holding a personal electronic device, comprising:
    a base, said base having a body, wherein said body comprises a semi spherical shape having a first end and a second end and defining a plurality of apertures formed in said body, wherein said second end comprises a neck extending from said second end;
    a flexible bladder, wherein said base is positioned within said bladder such that said neck of said base extends upward to an opening in said bladder, wherein said bladder is attached to said neck of said base;
    a hollow rounded conical cap, wherein said rounded conical cap is attached to said bladder so as to encapsulate an upper portion of said bladder, wherein said rounded conical cap is attached to said base at said neck, wherein said rounded conical cap is configured for attachment of a portable media device; and
    wherein said ballast filling said bladder, wherein said ballast comprises a granular fill material configured to flow through said apertures in said body and around said body within said bladder and to solidify in said apertures in said body and around said body to secure said stand when said stand is positioned on a surface by a user.

2. The apparatus of claim 1, wherein said rounded conical cap is attached to said neck by a magnet.

3. The apparatus of claim 1, wherein said rounded conical cap is removably attached to said neck.

4. The apparatus of claim 1, wherein said apparatus is configured with a charging system configured to charge a wireless media device positioned on said apparatus.

5. The apparatus of claim 4, wherein said charging system comprises a wireless charging device integrated into said apparatus.

6. The apparatus of claim 4, wherein said apparatus comprises a battery configured to supply power to said charging device to charge said portable media device.

7. The apparatus of claim 1, wherein said neck comprises a female opening in a first end of said neck, wherein said rounded conical cap comprises a post extending from an underside of said rounded conical cap and configured for mating engagement with said female opening in said first end of said neck.

8. The apparatus of claim 1, wherein said bladder is connected to said neck by a retaining ring.

9. The apparatus of claim 6, wherein said post is secured in said female opening by magnetic attraction.

10. The apparatus of claim 6, wherein said post is secured in said female opening by an adhesive.

11. The apparatus of claim 1, wherein said rounded conical cap comprises a planar edge formed in a side of said rounded conical cap, wherein said rounded conical cap is configured for attachment to a portable media device at said planar edge.

12. The apparatus of claim 10, wherein said planar edge comprises an attachment mechanism selected from the group consisting of magnets and hook and loop fasteners.

13. The apparatus of claim 11, wherein said planar edge comprises a recess formed in said planar edge, wherein said recess houses at least one magnet.

14. The apparatus of claim 1, wherein said rounded conical cap comprises a finger groove.

15. The apparatus of claim 1, wherein said base comprises a ring positioned between said body and said neck.

16. The apparatus of claim 1, wherein said bladder comprises an elastic material.

17. The apparatus of claim 1, wherein said bladder is attached to said neck by a retaining clip.

18. The apparatus of claim 1, wherein said rounded conical cap is configured for attachment to a portable media device by a threaded recess positioned in said rounded conical cap, wherein said threaded recess is configured for mating engagement with a threaded post of a portable media device.

19. The apparatus of claim 1, wherein said rounded conical cap comprises a hook extending therefrom.

* * * * *